United States Patent [19]

Lindstrom et al.

[11] 4,035,029
[45] July 12, 1977

[54] APPARATUS FOR SEPARATING ENTANGLED OBJECTS FROM EACH OTHER, SUCH AS SPRINGS OR OTHER OBJECTS HAVING A TENDENCY TO HITCH TO EACH OTHER

[75] Inventors: Jan Lindstrom, Taby; Bengt Anders Fredrik Nilsson, Saltsjo-Duvnas, both of Sweden

[73] Assignee: Tekno-Detaljer AB, Sweden

[21] Appl. No.: 620,577

[22] Filed: Oct. 8, 1975

[30] Foreign Application Priority Data

Oct. 16, 1974 Sweden .............................. 7413052

[51] Int. Cl.² ........................................ B65G 51/02
[52] U.S. Cl. .............................. 302/2 R; 198/953; 214/8.5 E; 221/200; 221/278
[58] Field of Search ................ 302/1, 2 R; 214/8 E; 221/1, 200, 278; 198/1, DIG. 3, 953

[56] References Cited

U.S. PATENT DOCUMENTS

| | | | |
|---|---|---|---|
| 2,657,812 | 11/1953 | Fox | 214/8.5 E |
| 2,760,679 | 8/1956 | Chadderton et al. | 214/8.5 E |
| 3,042,181 | 7/1962 | Rise | 198/288 |
| 3,118,564 | 1/1964 | Vokes | 221/1 |
| 3,346,305 | 10/1967 | Heymann | 302/2 R |
| 3,542,185 | 11/1970 | Geyer et al. | 302/2 R |
| 3,625,570 | 12/1971 | Ford | 302/2 R |

Primary Examiner—Johnny D. Cherry
Assistant Examiner—Jeffrey V. Nase
Attorney, Agent, or Firm—Weingarten, Maxham & Schurgin

[57] ABSTRACT

An apparatus for disentangling objects such as coil springs. The apparatus includes a receptacle which is generally symmetrical about an axis and has a radially directed discharge opening for the separated individual objects. A generally helical air flow moves the objects through the receptacle and a roughened inner receptacle surface facilitates separation of the objects.

8 Claims, 6 Drawing Figures

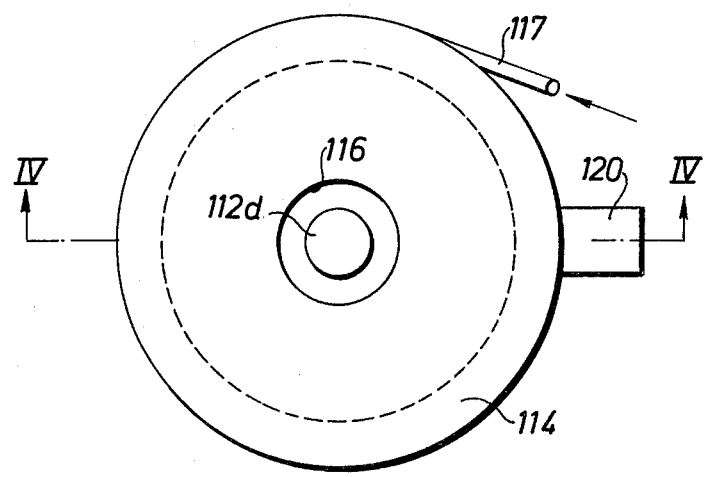
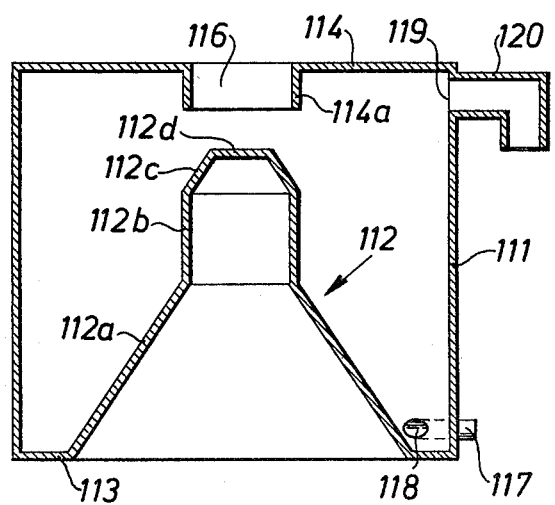

APPARATUS FOR SEPARATING ENTANGLED OBJECTS FROM EACH OTHER, SUCH AS SPRINGS OR OTHER OBJECTS HAVING A TENDENCY TO HITCH TO EACH OTHER

FIELD OF THE INVENTION

The present invention relates to an apparatus for separating entangled objects from each other, such as springs or other objects having a tendency to hitch to each other.

DISCUSSION OF THE PRIOR ART

In the mechanical and electrical industry, one type of component frequently used in the various apparatus and equipments manufactured is springs, especially coiled springs. However, the tendency of springs to become entangled or hitch to each other has caused severe drawbacks in connection with the installation thereof in apparatus and equipment of the type mentioned. Therefore, since long ago, it has been desirable in such industries to have an apparatus which can separate entangled objects, especially springs, from each other in order to simplify and facilitate the subsequent use of the individual objects.

SUMMARY OF THE INVENTION

An object of the invention is to provide such an apparatus which is of simple and reliable structure and can perform the desired function in a positive and efficient manner. More particularly, the invention relates to an apparatus for separating objects which comprises a receptacle of substantially symmetrical configuration and means for generating a generally helical flow of air along the inner surface of the outer wall of the receptacle. By means of the geometry of the receptacle and the air flow therein objects received in the receptacle are moved from one end thereof to a discharge opening distant from the first end. The inner surface of the outer wall of the receptacle is configured to have a breaking or disturbing effect on the objects carried by the air flow when they contact the wall.

The breaking or disturbing action on the objects serves to expose them to shocks or vibrations and such action may be obtained by providing the outer wall of the receptacle, which suitably may consist of sheet metal or steel, with a coarse inner surface or with surface irregularities on its inner side. The desired surface irregularities may be obtained for instance by providing a plurality of welding spots on said wall surface. Alternatively, the inner surface of the outer wall may be roughened by being sandblasted or by being knurled. However, the desired function may also be obtained by forming at least an inner portion of said wall from a material having a high friction coefficient. For example, the outer wall of the receptacle may be provided with a separate inner lining of a suitable material such as hard rubber which could be vulcanized on the inner surface of the wall. If desired, even the lining may have a rough inner surface.

The whirl-like air flow along the inner side of the outer wall may be produced in various manners. In a preferred embodiment of the invention an air inlet is provided in the outer wall of the receptacle to extend in a substantially tangential direction. Pressurized air may be fed into the receptacle through said inlet to cause the desired flow of air within the receptacle. This means that the receptacle need not be provided with any moveable members for generating the desired air flow and, of course, no driving motor or other special driving means for such members would be needed. In practice, it has been found that the air inlet may advantageously be located at some distance from the first end of the receptacle from which the objects are to be moved by the action of the air flow.

The receptacle may be provided with an inner wall located in coaxial relation to the outer wall to define an annular space between the inner and outer wall. Such inner wall may extend along the whole length of the receptacle which also will have a substantially annular shape.

The discharge opening of the receptacle may suitably be located in the outer wall near the other end of the receptacle where the receptacle may be provided with a cover or an end wall closing the receptacle at its second or other end. A discharge pipe may be connected to the discharge opening to extend in a substantially radical outward direction from that opening. The receptacle may be arranged in an upstanding position. However, it may also be inclined or arranged with its longitudinal axis in a fully horizontal position.

BRIEF DESCRIPTION OF THE DRAWING

The objects, features and advantages of the present invention will be more clearly perceived from the following detailed description when read in conjunction with the accompanying drawing in which:

FIG. 3 is a plan view of an alternative embodiment of the invention;

FIG. 4 is a sectional elevation of the apparatus taken along cutting plane IV—IV of FIG. 3;

DESCRIPTION OF THE PREFERRED EMBODIMENTS

Figure 1:
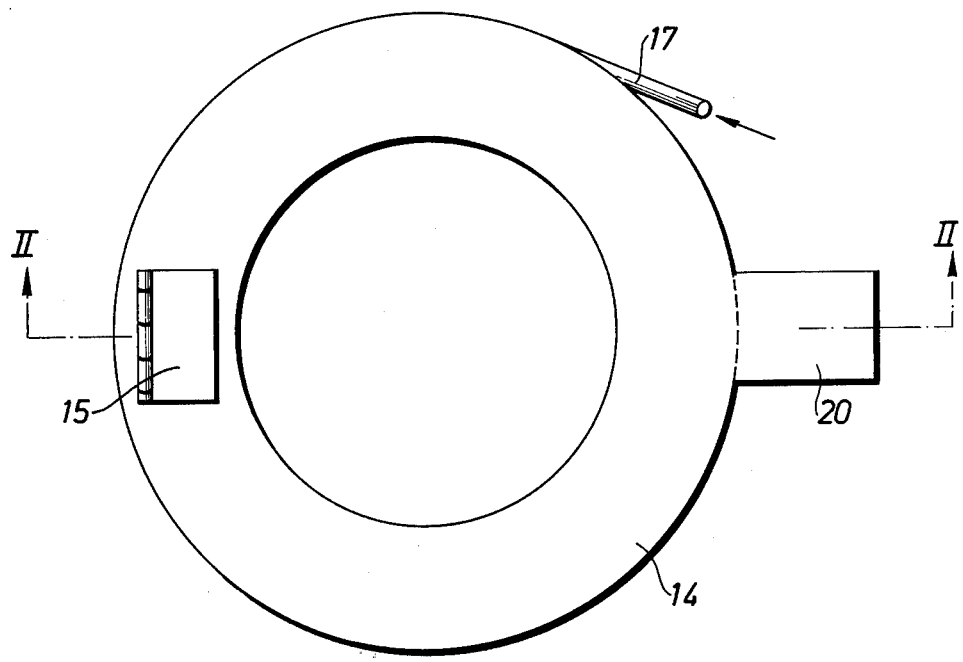
FIG. 1 is a plan view of a preferred embodiment of the present invention.
Figure 2:
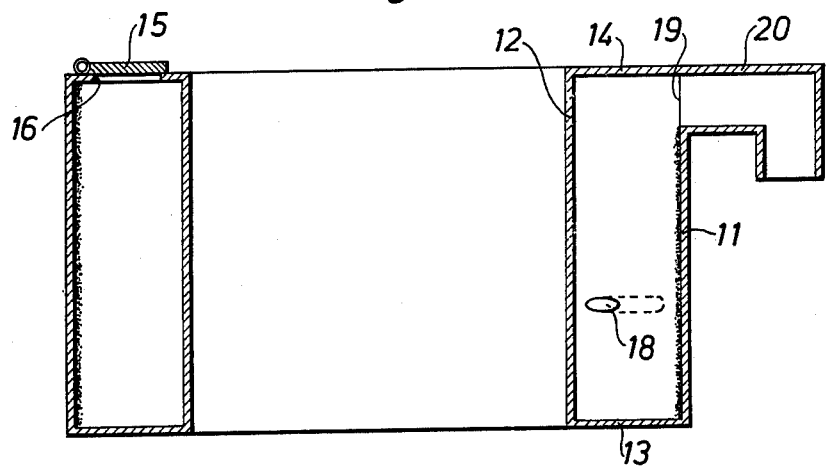
FIG. 2 is a sectional elevation taken along cutting plane II—II of FIG. 1.

In FIGS. 1 and 2 there is shown an apparatus comprising a receptacle having an annular cross-section and being substantially symmetrical about an axis. Said receptacle has an outer cylindrical wall 11 and an inner cylindrical wall 12 coaxial with the outer wall. At the lower end of the receptacle the annular space defined between the two walls 11 and 12 is closed by means of a plane bottom 13. In an upward direction the annular space is confined by a cover 14 connected to the two walls 11 and 12. In cover 14 there is provided an opening 16 which may be closed by a flap 15 and through which entangled objects, such as coiled springs, may be inserted into the receptacle to become separated from each other. Flap 15 may be locked or otherwise retained in closed position by any means desired.

Reference numeral 17 designates a tangentially extending tube which terminates in an opening 18 in the outer wall 11 of the receptacle. Tube 17 and opening 18 form an inlet through which pressurized air may be fed into the receptacle from a suitable source (not shown) connected to tube 17 through a flexible hose or similar means. In practice, tube 17 may be replaced by a threaded nipple to which a suitable nozzle may be coupled. As can be seen from FIG. 2, opening 18 and tube 17 are both located at a comparatively large distance from the bottom 13 of the receptacle. At its upper end the outer wall 11 is provided with a discharge opening 19 from which a short discharge pipe 20 of rectangular cross-section extends radially in an outward direction. At its outer end the discharge pipe 20 is provided with a downward outlet opening.

The function and operation of the apparatus above described will now be explained in detail. When a plurality of the objects intended to be separated from each other have been inserted into the receptacle through opening 16 and flap 15 has then been moved to its closing position and secured in any suitable manner, pressurized air is supplied through the air inlet formed by tube 17 and opening 18. This supply of air will cause an upward whirl-like flow of air along the inner side of the outer wall 11. This air flow will impart a motion to the objects previously resting on the bottom 13 of the receptacle and cause them to move along generally helical paths along the inner surface of the outer wall 11. As schematically illustrated in the drawing, the outer wall 11 may have a comparatively rough or coarse inner surface whereby the objects carried by the air flow will be subjected to shocks or vibrations when they contact the wall repeatedly during their movement from the bottom of the receptacle to the discharge opening 19. These shocks and vibrations will cause a successive separation of entangled objects from each other. The coarse structure of the inner surface of the outer wall 11 serves to disturb the movement of the objects and prevents them from sliding smoothly along said wall. When the objects reach the discharge opening 19 they are discharged through said opening and pass through the discharge pipe 20 to the outlet opening of pipe 20 where they may fall freely down to a collector or a device for feeding them to a predetermined usage station or several different such stations. Through tests where the apparatus has been used for separating coiled springs it has been found that it offers a very efficient separating effect on any entangled objects. In this connection it could be mentioned that the radical orientation of the discharge pipe 20 was found to cause an improved separation in comparison to that obtainable when using a tangentially extending discharge pipe.

The embodiment shown in FIGS. 3 and 4 illustrates one possible modification of the apparatus according to FIGS. 1 and 2. In order to facilitate a comparison between the two embodiments the various parts of the apparatus shown in FIGS. 3 and 4 have been provided with the same reference numerals as used for corresponding parts in the previously described embodiment, but each numeral is preceded by the prefix "1". Therefore, the description of the apparatus according to FIGS. 3 and 4 may be restricted mainly to the differences existing between this embodiment and the first embodiment.

As can be seen from FIG. 4, the inner wall 112 which is surrounded by the outer wall 111 extends only along a portion of the total height of the receptacle. Furthermore, the inner wall 112 does not have a simple cylindrical shape. Instead, that wall is composed of a lower frusto-conical portion 112a, an adjoining cylindrical portion 112b, an upper frusto-conical portion 112c and an upper horizontal portion or cap 112d.

The cover 114 of the receptacle has a central opening 116 through which objects intended to be separated from each other may be inserted into the receptacle. Said opening is not provided with any lid or cover. Instead, it is surrounded by a downwardly extending annular flange 114a on the lower side of cover 114.

From FIG. 4 it can also be seen that the inlet for pressurized air formed by tube 117 and opening 118 is located only at a short distance from the bottom 113 of the receptacle. On the other hand, the discharge opening 119 and the discharge pipe 120 are disposed or arranged substantially in the same way as in the first embodiment.

The function of the apparatus shown in FIGS. 3 and 4 differs from that of the apparatus according to FIGS. 1 and 2 primarily in that during the operation of the apparatus air will be sucked into the receptacle through opening 116 and move downwardly in a whirl-like manner along the inner wall 112 towards the bottom 113 where said air will be added to the pressurized air supplied to the receptacle through inlet opening 118.

Figure 5:
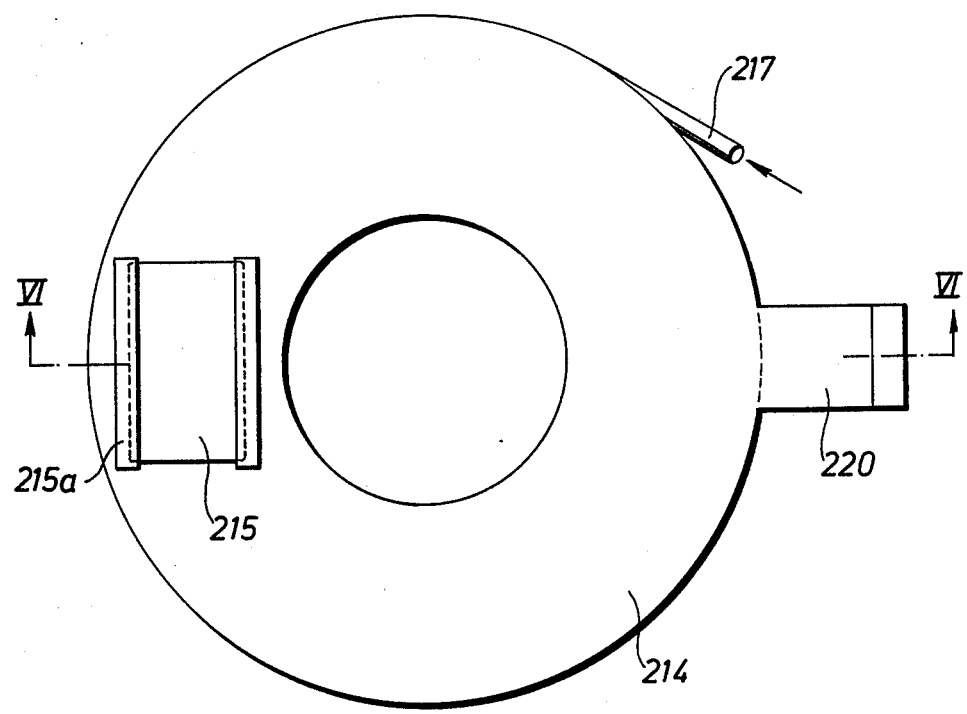
FIG. 5 is a plan view of another embodiment of the invention.
Figure 6:
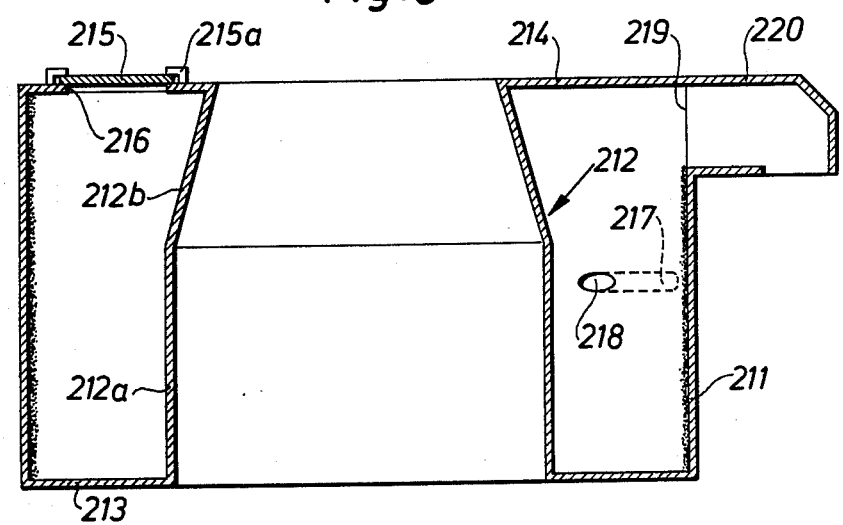
FIG. 6 is a sectional elevation of the apparatus taken along cutting plane VI—VI of FIG. 5.

In FIGS. 5 and 6 the various parts having their counterpart in the apparatus of FIGS. 1 and 2 have been provided with the same reference numerals preceded by the prefix "2".

As can be seen from FIG. 6, the inner wall 212 surrounded by outer wall 211 extends along the whole height of the receptacle. The inner wall 212 comprises a lower cylindrical portion 212a and an upper frusto-conical portion 212b.

In cover 214 there is provided an opening 216 for the insertion of objects to be separated from each other within the receptacle. Opening 216 is provided with a lid 215 which may be displaceably received between two guide rails 215a.

The air inlet opening 218 and the tube 217 are located at a substantial distance from the bottom 213 of the receptacle. Similar to the embodiments previously described the discharge opening 219 and the discharge pipe 220 are located at the upper end of the receptacle.

The function of the apparatus shown in FIGS. 5 and 6 is substantially the same as for the apparatus of FIGS. 1 and 2 previously described.

In light of the above detailed description, it is likely that modifications and improvements which are within the scope of this invention will occur to those skilled in this art.

What is claimed is:

1. An apparatus for separating individual entangled objects from each other, said apparatus comprising:
   a receptacle for holding a supply of said objects and having a first end, a second and an object discharge opening adjacent said second end, said receptacle comprising:
   an outer wall having an inner surface; and
   an inner wall within said outer wall, said inner and outer walls being symmetrical about a common axis;
   a multiplicity of discrete roughening elements comprised of welding spots distributed over said inner surface of said outer wall; and
   means coupled to the interior of said receptacle between said inner and outer walls to provide a helical flow of air along said inner surface of said outer wall;
   whereby said air flow moves said objects helically from said first end toward said discharge opening of said receptacle, said objects being directed against said inner surface of the outer wall by said air flow and being subjected to substantially continuous shocks and vibrations caused by collisions with said welding spots whereby said objects become disengaged from one another and are individually removed from said receptacle through said discharge opening.

2. The apparatus according to claim 1 wherein said means for generating a helical flow of air comprises an air inlet coupled to the interior of said receptacle in substantially tangential orientation with respect to said outer wall, whereby air fed through said air inlet under pressure causes said helical flow of air.

3. An apparatus for separating individual entangled objects from each other, said apparatus comprising:
a receptacle substantially symmetrical about an axis, said receptacle having an outer wall, an inner wall juxtaposed in coaxial relation to said outer wall to thereby define an annular space between said inner and outer walls, said inner wall extends along the entire length of said receptacle, said receptacle further having a first end, a second end and a discharge opening spaced from said first end toward said second end; and
means coupled to the interior of said receptacle for generating a helical flow of air along the inner surface of said outer wall of said receptacle, said air flow moving said objects from said first end of said receptacle to said discharge opening. a substantial and continuous portion of said inner surface being configured to subject the objects being carried by said air flow to repeated and a substantially continuous series of shocks and vibrations on each revolution as they travel around said container and contact said wall.

4. The apparatus according to claim 3, said receptacle further comprising, at said second end, a cover closing the annular space at said second end of said receptacle.

5. An apparatus for separating individual entangled objects from each other, said apparatus comprising:
a receptacle substantially symmetrical about an axis, said receptacle having an outer wall, a first end, a second end and a discharge opening spaced from said first end toward said second end;
an inner wall having a generally frusto-conical shape having a height less than the distance between said first and second ends of said receptacle, said outer wall being generally cylindrical, thereby defining a space between said inner and outer walls which generally increases in area with greater distance from said first end of said receptacle toward said second end;
a cover substantially closing said second end of said receptacle, said cover having a centrally spaced opening therethrough, said cover having a centrally spaced opening therethrough, said opening being located above the top of said frustoconical inner wall;
an annular flange extending downwardly into said interior of said receptacle and spaced from said frusto-conical inner wall; and
means coupled to the interior of said receptacle for generating a helical flow of air along the inner surface of said outer wall of said receptacle, said air flow moving said objects from said first end of said receptacle to said discharge opening, a substantial and continuous portion of said inner surface being configured to subject the objects being carried by said air flow to repeated and a substantially continuous series of shocks and vibrations on each revolution as they travel around said container and contact said wall.

6. The apparatus according to claim 5 wherein said means for generating a helical flow of air comprises an air inlet coupled to said interior of said receptacle in substantially tangential orientation with respect to said outer wall and adjacent said first end of said receptacle, whereby air fed through said air inlet under pressure causes said helical flow of air.

7. An apparatus for separating individual entangled objects from each other, said apparatus comprising:
a receptacle substantially symmetrical about an axis, said receptacle having an outer wall, a first end, a second end and a discharge opening spaced from said first end toward said second end;
an inner wall extending from said first end to said second end of said receptacle, a portion of said inner wall extending from said first end being cylindrical, the remainder of said inner wall between said second end of said receptacle and said cylindrical portion being frusto-conical in shape, said outer wall being generally cylindrical, thereby defining the receptacle space between said first and second walls as annular for a distance from said first end and increasing in cross sectional area from the juncture of said cylindrical with said frustoconical inner wall portions to said second end of said receptacle; and
means coupled to the interior of said receptacle for generating a helical flow of air along the inner surface of said outer wall of said receptacle, said air flow moving said objects from said first end of said receptacle to said discharge opening, a substantial and continuous portion of said inner surface being configured to subject the objects being carried by said air flow to repeated and a substantially continuous series of shocks and vibrations on each revolution as they travel around said container and contact said wall.

8. The apparatus according to claim 7 wherein said receptacle further comprises a cover of substantially annular configuration closing the space between said inner and outer walls at said second end of said receptacle.

* * * * *

UNITED STATES PATENT AND TRADEMARK OFFICE
CERTIFICATE OF CORRECTION

PATENT NO. : 4,035,029
DATED : July 12, 1977
INVENTOR(S) : Jan Lindstrom et al

It is certified that error appears in the above-identified patent and that said Letters Patent are hereby corrected as shown below:

Column 5, lines 54-55, delete "said cover having a centrally spaced opening therethrough,"

(phrase is repeated)

Signed and Sealed this

Eighth Day of November 1977

[SEAL]

Attest:

RUTH C. MASON
Attesting Officer

LUTRELLE F. PARKER
Acting Commissioner of Patents and Trademarks